United States Patent [19]

Schultz et al.

[11] Patent Number: 4,924,785
[45] Date of Patent: May 15, 1990

[54] THERMAL CLEANING SYSTEM

[75] Inventors: Thomas J. Schultz, Maumee; Jay K. Shah, Sylvania; Valdis R. Daiga, Toledo, all of Ohio

[73] Assignee: Surface Combustion, Inc., Maumee, Ohio

[21] Appl. No.: 280,014

[22] Filed: Dec. 5, 1988

[51] Int. Cl.$^5$ .............................................. F23G 5/00
[52] U.S. Cl. .................................. 110/346; 110/185; 110/229; 110/236
[58] Field of Search ............... 110/229, 236, 346, 185

[56] References Cited

U.S. PATENT DOCUMENTS

| | | | |
|---|---|---|---|
| 3,780,676 | 12/1973 | Hazzard et al. | 110/8 A |
| 3,819,323 | 6/1974 | Hemsath et al. | 432/138 |
| 3,909,953 | 10/1975 | Hemsath et al. | 34/26 |
| 4,441,922 | 4/1984 | Most et al. | 110/236 X |
| 4,474,121 | 10/1984 | Lewis | 110/346 |
| 4,517,906 | 5/1985 | Lewis et al. | 110/346 |
| 4,649,834 | 3/1987 | Heran et al. | 110/190 |
| 4,821,653 | 4/1989 | Jones | 110/229 |

OTHER PUBLICATIONS

Paper Entitled "Pyrolytic Incineration of Hazardous and Toxic Waste" Dated Mar., 1987 Presented at the 1987 Spring National Meeting of The American Institute of Chemical Engineers.

*Primary Examiner*—Edward G. Favors
*Attorney, Agent, or Firm*—Body, Vickers & Daniels

[57] ABSTRACT

A semi-continuous pyrolysis arrangement is disclosed which is particularly useful in the reclamation of a base material in a substantially pure form from a composite material which has organic compounds. The furnace base barrier free zones wherein the waste material is continuously pyrolyzed as it is indexed through the furnace and each zone is controlled in a preset manner established from pyrolyzing a sample waste specimen under controlled conditions. Preferably, the waste is containerized as a particulate solid in discrete static beds permitting a fan exhaust arrangement to establish convective heat transfer with the bed while also establishing the furnace zones. An exothermic zone is provided at the end of the furnace to remove fixed carbon from the pyrolyzed waste by bleeding substoichiometric amounts of air in an oxygen temperature controlled manner to permit recovery of the waste in a substantially pure form.

42 Claims, 5 Drawing Sheets

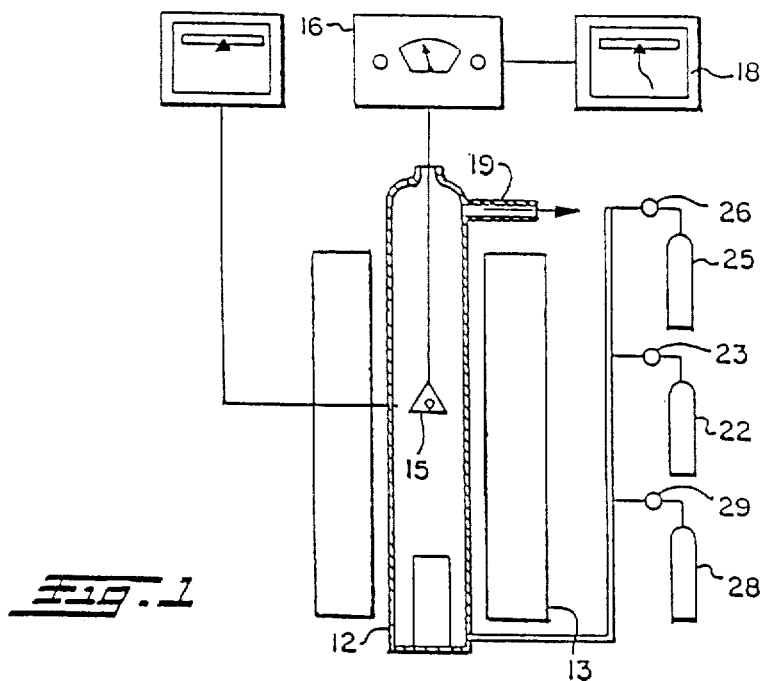
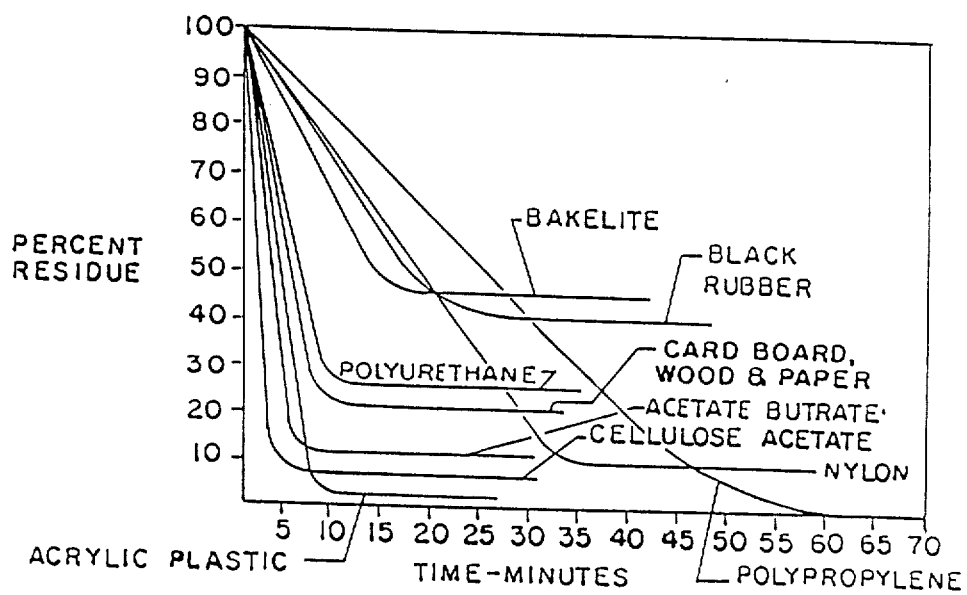

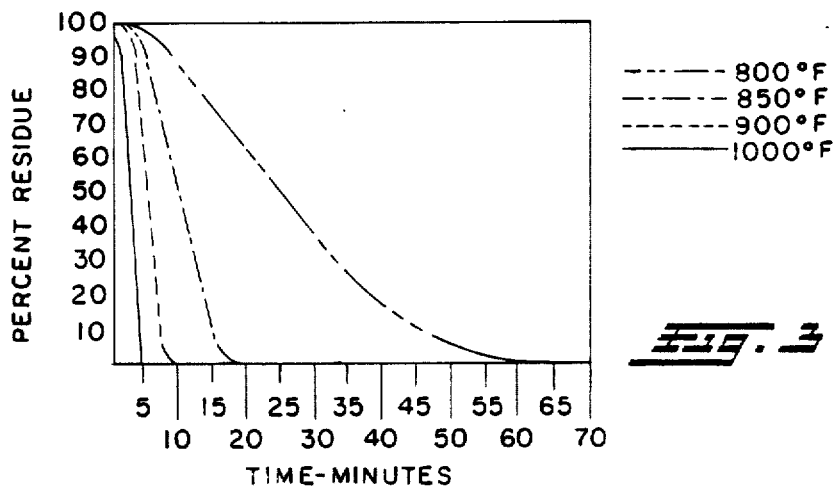
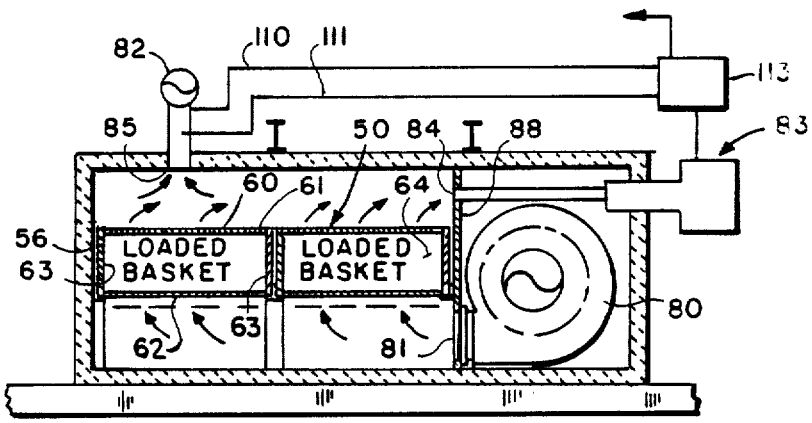
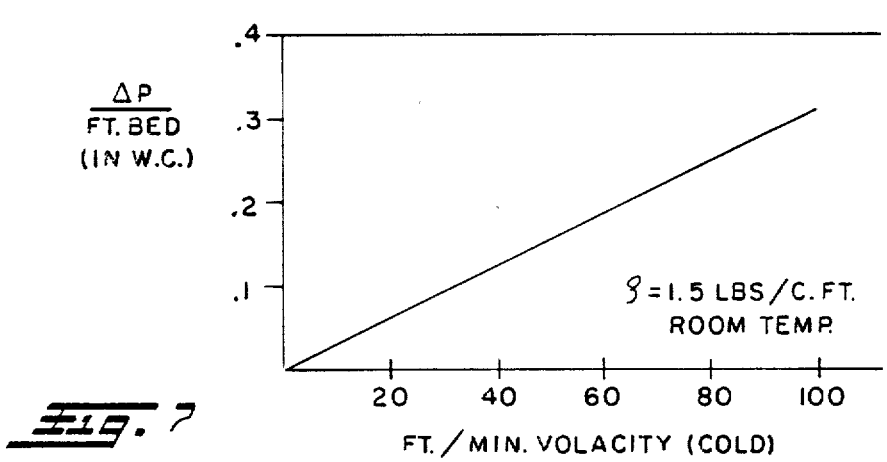

TEMPERATURE VS. TIME
PERCENT WEIGHT LOSS VS. TIME

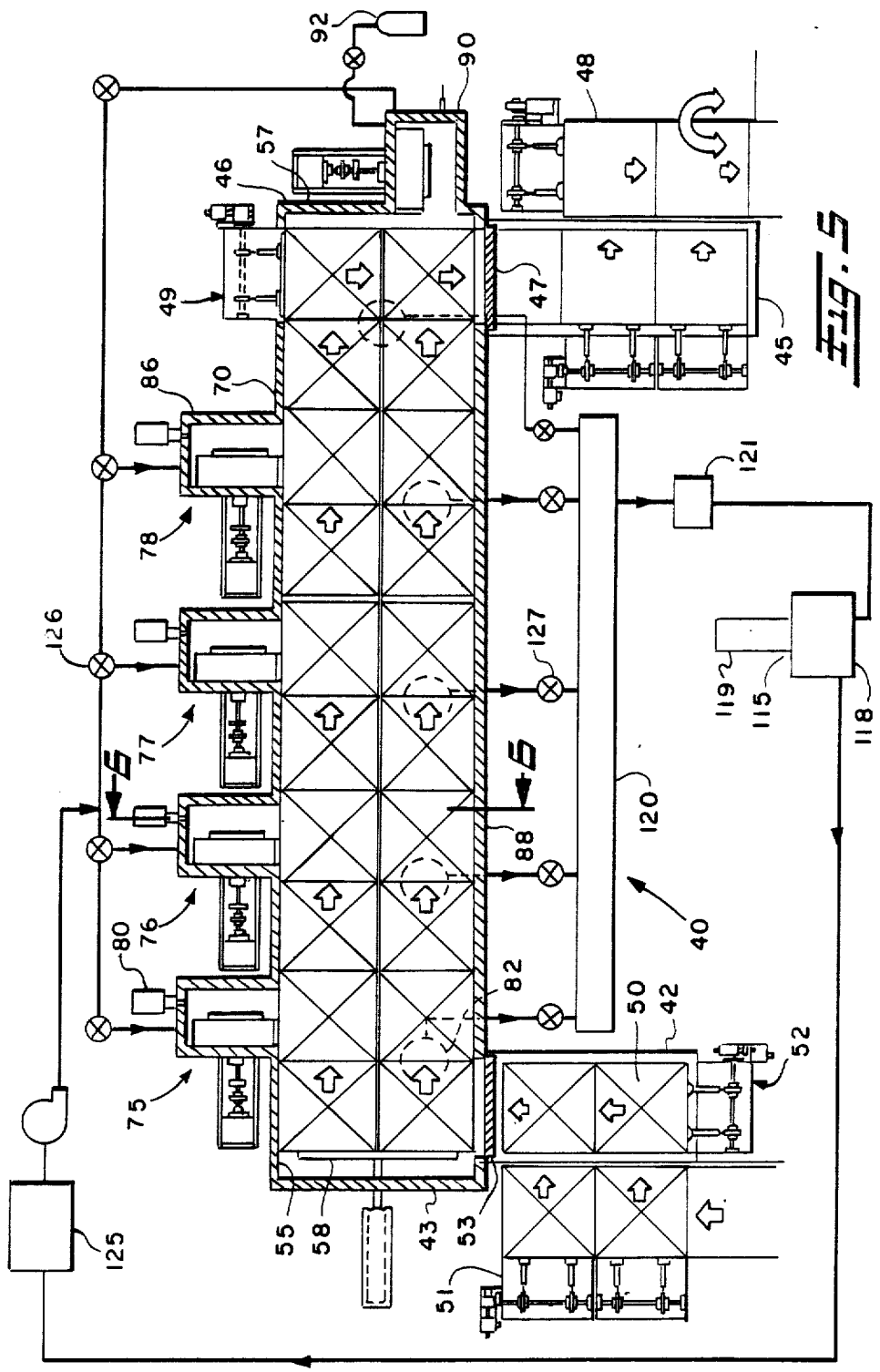

THERMAL CLEANING SYSTEM

BACKGROUND

The literature in the pyrolysis art frequently use terminology which is incorrect or misleading. For purposes of this application, some general understandings with respect to the terminology used herein and as used in the claims hereof will have the following meanings. "Pyrolysis" in a technical sense means the chemical decomposition or change in a material brought about by heating the material in the absence of oxygen. As a practical matter, oxygen is always present in the combustion chamber of any commercial waste treatment facility. This results because of the practical limitations in constructing a perfectly sealed furnace operated at standard atmosphere. Thus, if the furnace is operated at pressures slightly over standard atmosphere, fumes will leak from the furnace during the process. Since the fumes can be toxic, the furnace must be operated at a neutral to slightly negative pressure which thus draws air into the furnace during the operation. This means that pyrolysis in the technical sense cannot be performed. It must be noted that there are furnace constructions using double walled vessels with water jackets in the vacuum furnace art which can develop perfect seals and such furnaces could accomplish true pyrolysis. The waste applications under discussion and to which this invention relates involve economies of scale including size which prohibit this type of furnace construction. Accordingly, when pyrolysis is used in this specification, it is used in the sense that some oxygen is inherently present in the furnace chamber.

The specification will discuss the pyrolysis process along the classical lines of whether or not the thermal reactions are endothermic or exothermic. The atmosphere which is present in the furnace will then be discussed with reference to the percentage of volatiles present in that atmosphere as either being within or outside the explosive limit. That is, and is conventionally known (for example see assignee's U.S. Pat. No. 3,909,953), a gaseous mixture composed entirely of volatiles will ignite, combust or explode when the oxygen content in that atmosphere rises from zero percent to a certain percent (lower explosive limit) and this explosive mixture will continue until the mixture is so diluted with air that the volatiles within the mixture cannot support ignition (upper explosive limit). That concentration of oxygen in the atmosphere at the lowest possible percentage where the volatiles are capable of being ignited will be defined and used throughout the specifications as the "lower explosive limit" (L.E.L.). The "L.E.L." and "U.E.L." definitions used herein are reversed from their conventional meanings. Normally, combustibles are admitted to an air enclosed space until the L.E.L. is reached (typically about 4% combustibles) and the explosive mixture continues until the U.E.L. is reached (typically about 4% oxygen).

Other terms which tend to be confused in the art include "stoichiometric", "starved air" or "starved combustion" and "sub-stoichiometric". Stoichiometric is technically defined as an adjective characterized by being a portion of substances exactly right for a specific chemical reaction with no excess of any reactant or product. It is typically used in the burner art to mean that metered amounts of fuel and combustion air are supplied to the burner so that the fuel is completely combusted by the precise amount of air provided. "Starved air" means that the air is supplied at a rate which is less than stoichiometric when compared to that amount of oxygen required for stoichiometric combustion of the material. For purposes of this specification, the "starved air" mode will mean, arbitrarily, oxygen supplied at a rate equal to anywhere from 40–99 percent of the oxygen required to achieve stoichiometric combustion. "Sub-stoichiometric", as used herein, will mean significantly less oxygen than that applied in the starved air mode and will mean anywhere from 1–10 percent of the oxygen normally required to produce stoichiometric combustion. The terminology as thus defined is only of limited value because for certain exothermic reactions, combustion will occur even under the starved air and sub-stoichiometric conditions as a function of time. Nevertheless, the definitions are helpful to distinguish incinerator apparatus operated in a starved air mode and erroneously referred to as a pyrolyzer. For example see U.S. Pat. No. 4,649,834 to Heran (incorporated herein by reference) describing a water activated temperature control system for a pyrolyzer which, in fact, appears to be a furnace operating under starved air conditions. Reference may also be had to U.S. Pat. Nos. 4,474,121 and 4,517,906 to Lewis (incorporated herein by reference) which discuss starved air combustion in terms of stoichiometric relationships and identifies the pyrolysis misnomer applied to such processes.

Insofar as pyrolyzing processes are concerned, the present inventors have developed and perfected for batch type pyrolyzing furnaces a two step process comprising an endothermic first step where pyrolysis is conducted followed by an optional "burnout" or incineration second step which burns off any residual fixed carbon. The endothermic step is generally conducted at temperatures between 250°–1400° F. and the exothermic step is generally conducted at temperatures between 1400°–2500° F. This is the general process as conventionally practiced by the inventors and includes an afterburner for combusting the volatiles distilled from the waste during the pyrolyzing process. Heretofore, the incineration or burn-out step, being an exothermic reaction, was not controlled.

Within the published prior art, it is generally accepted that pyrolysis is defined as a two step process in the sense that the waste is pyrolyzed in the first step and the fumes or volatiles emitted from the waste are combusted in an afterburner in the second step. The reason for dividing the process into two steps is because the endothermic reaction can be controlled. In the starved air systems discussed above, the reactions which are both exothermic and endothermic cannot be controlled and thus the reason for many of the control schemes present in the art which are then necessary to prevent the waste material "taking off" and producing an explosive mixture.

Insofar as controllability is concerned with respect to the endothermic reactions, the inventors have developed for use in their pyrolyzing batch type furnaces, a concept defined herein as "signature heat profile". Insofar as is pertinent to the discussion of the prior art as practiced by the inventors, it is known to take a sample of a waste specimen, and pyrolyze the specimen at various temperatures while recording the weight loss of the specimen until volatilization is achieved in optimal processing times. The time-temperature profile thus obtained in the gravimetric furnace then becomes the "signature" which is programmed into the commercial pyrolyzing furnace for treating the waste. In this manner, batch pyrolyzing of complex, heterogeneous waste material (including many hazardous and toxic substances) containing competing reactions has now been achieved. The signature heat profile concept gradually evolved over a period of several years and it is still evolving. Heretofore, the signature heat profile concept has only been applied in batch furnace processes.

Outside of signature profiling, batch furnaces in the prior art simply fired or heated the work to some upper limit temperature and monitored the gases, not only in the furnace chamber but also downstream of the burner. When the process started running out of control, the heat was initially reduced and, if this was not sufficient, a water spray was introduced. In shaft and sliding bed continuous furnaces, a further variable, the rate of feed was controlled. Further, in shaft and sliding bed furnaces, the waste, after treatment, was simply examined and then temperature and rate was varied until an acceptable end product was produced. None of the control systems, with the exception of signature profiling, is generally adequate for commercial installations involving complex, heterogeneous waste materials.

With respect to the various apparatuses used to pyrolyze waste, a fundamental distinction is made between batch type pyrolyzing furnaces and continuous type pyrolyzing furnaces. The pyrolyzing furnaces for all intents and purposes are equivalent in structure or mode of operation to those used in the industrial furnace art. Batch type furnaces are essentially box type furnaces and are distinguished by the types of drive mechanisms used to transfer containerized waste into and out of the furnace. Batch furnaces are thus further defined as "roller hearth" where the containerized feed enters the furnace at one end and is discharged at the other end and rollers, either free or driven, move the load into and out of the furnace. "Roller rail" batch furnaces use, as the name indicates, rollers riding on a rail with charge and discharge fixtures external to the furnace to push or pull the work into and out of the furnace. Finally, "car bottom" furnaces are basically cars containing the waste riding on a rail which are either then lifted into the furnace chamber or the furnace chamber is dropped onto the car to define the furnace enclosure. Waste pyrolyzing has been successfully practiced in batch furnaces. The process has achieved limited commercial success in continuous or semi-continuous furnaces which usually involve installations dedicated to processing only a few types of waste materials.

Insofar as continuous furnaces are concerned, there are essentially three different types of furnaces. One of the most common is a rotary kiln pyrolyzer which comprises essentially a horizontal rotating cylinder with the load to be heated tumbled on the inside. Transfer of the waste, usually in the form of loose solids or sludges, can be assisted by angling the axis of rotation of the kiln a few degrees so that the charge end is higher than the discharge end. In addition, a helical auger is typically installed on the kiln's inside diameter transforming the kiln into a sort of Archimedes' screw. Another classification of continuous furnace includes vertical shaft and sliding bed furnaces where granular material is fed at the top of a cylindrical shaft and the material discharged at the bottom. Various bustle and tuyere arrangements are employed to treat the load falling through the furnace as a continuous fluidized bed. One of the stages or zones in the furnace usually employs a starved air if not a pyrolyzing zone. A third type of continuous furnace, which has experienced some commercial success, is defined as a rotary hearth which is normally used for processing of sludges or granular solids. It has a doughnut shaped hearth rotating in a stationary furnace chamber and waste material is continuously fed in a cold zone. A stationary spreader distributes the feed material uniformly in a radial direction as the hearth rotates under the spreader. The feed is passed through a hot zone while the solid residue is continuously discharged by a screw conveyor. Dropped arches in the hearth separate the hot and the cold zone. Because there is some similarity to the pyrolyzing furnaces thus described to the furnaces used in the industrial heat treat art, it should be noted that dropped arches are conventionally used in pusher slab reheat furnaces and the like employed in the steel mill industry to define zones wherein atmosphere and temperature of the work can be controlled for heat treat purposes. A barrier free rotary hearth has been achieved by the means of free standing jets as shown in assignee's U.S. Pat. No. 3,819,323 (incorporated herein by reference). Such jets are not suitable for establishing zones in a pyrolysis furnace where granular or loose material is to be pyrolyzed. None of the furnace arrangements described permit continuous or, more precisely, semi-continuous treatment of containerized wastes. The continuous furnaces can treat only loose bulk material (which for certain waste is not feasible) and it is very difficult, if not impossible, for certain wastes to accurately control a zone of a moving bed which can have varying densities, uneven temperatures, etc.

The furnace chamber where the waste is pyrolyzed is, generally, indirectly heated. Either electrically heated or fuel fired radiant tubes are used or any one of a number of schemes using the afterburner heat can be employed to indirectly heat the waste in the furnace chamber. It is also conventional to use direct fired burners to heat the waste in the furnace chamber. The burners are operated at stoichiometric or slightly less than stoichiometric conditions. In such arrangements which include all the batch furnaces, the rotary kiln and the rotary hearth, convective heat transfer is not significant. The waste is generally heated for the most part by conduction and radiation. This increases the time required for processing the material. Only in the vertical shaft and sliding bed furnaces does convective heating predominate. However, as noted above, such furnaces have inherent problems limiting their application. Obviously, the time for the pyrolyzing process is materially enhanced to the extent that convective heat transfer can be utilized, provided the endothermic reaction can be controlled.

Insofar as the end material after pyrolysis is concerned, it has always been known that the char recovered could function as a useful end product, i.e. fertilizer. It has also been known that pyrolysis can be used to recover, for recycling purposes, metal. For example, the Heran patent noted above uses starved air to burn off polymeric materials from metal parts so that the metal, i.e. copper in armatures, staters, etc., can be recovered. In U.S. Pat. No. 3,780,676 to Hazzard (incorporated herein by reference), a rotary kiln pyrolyzer is used to recover the aluminum or gold foil or silver found in circuit boards or photographic film.

As noted in the Hazzard patent, using starved air, such as in the Heran patent, generates metal oxides which then hinders the ability of the process to recover all the metal. However, simply conducting the endothermic step as defined in the Hazzard patent leaves "fixed carbon", a carbon residue or polymer embedded on the metal's surface. If the fixed carbon is simply burned off in the conventional incineration sense, the metal oxide problem is present. The presence of fixed carbon on the reclaimed metal may or may not present a problem in the metal recycling process depending upon the particular process which uses the reclaimed metal. However, the fixed carbon will always be a problem if a non-metallic heterogeneous composite material having organic material is present. With the exception of the metallic reclamation processes discussed, which are not perfected for reasons noted, there has not been any processes which can successfully and efficiently thermally reclaim heterogeneous metallic or non-metallic composites having organic compound(s) in a substantially pure form. When used throughout the specification and claims, the term "substantially pure" means fit for reclamation which, depending on the reclamation process for the base material, may or may not mean the base material in its elemental pure form.

SUMMARY OF THE INVENTION

Accordingly, it is one of the principal objects of the invention to provide a pyrolyzing type process for reclaiming the base material, metallic or non-metallic, in a substantially pure form from a heterogeneous composite material which includes an organic compound as one of its elements.

This object along with other features of the invention is achieved for heterogeneous or composite materials having at least one organic material and a base material which is to be reclaimed. The base material must have a critical temperature higher than the volatilizing temperature of the organic material. For metals, the critical temperature is equal to the softening temperature, i.e. the temperature at which the metal softens and for non-metallic material, the critical temperature is defined to be the temperature at which the non-metallic base material melts, fuses or ignites (i.e. burns). In its broad sense, the invention includes heating of the composite material by controlling the temperature of the atmosphere composition in a furnace enclosure to produce an endothermic reaction of the organic material at a temperature less than the critical temperature. The endothermic reaction is continued until substantially all of the organic material has been volatilized and the composite material is transformed into fixed carbon and the base material. Next, a fixed amount of oxygen is injected into the atmosphere to produce an exothermic reaction between the furnace atmosphere and the fixed carbon while the temperature of the exothermic reaction is controlled to be less than the critical temperature. A metered amount of oxygen is continuously supplied to the atmosphere to permit the exothermic reaction to proceed until substantially all of the fixed carbon becomes associated with the atmosphere to permit recovery of the base material in a substantially pure form. More specifically, the oxygen is metered into the furnace enclosure at a substoichiometric rate while the atmosphere is controlled below the L.E.L. level and the temperature is maintained below the critical level to prevent the exothermic reaction from running out of control. This particular feature of the invention can be applied to batch furnaces.

In accordance with another feature of the invention, waste material is semi-continuously processed through a zoned furnace. In accordance with this feature of the invention, a sample of the waste material is heated in the substantial absence of oxygen at varying temperatures and time periods while recording the weight of the volatiles given off until the organic compounds of the waste materials have been substantially volatilized without ignition. The temperature and time periods obtained are then plotted as a controlled curve and the curve is divided into a discrete number of "n" segments generally based on temperature considerations. A furnace is then provided with appropriate vestibules having an entrance end and an exit end with a plurality of zones therebetween so that the total zones number "n", and equal the number of segments of the controlled curve with the first zone adjacent the entrance end of the furnace and the nth zone somewhat adjacent the exit end of the furnace. Conveying means are provided to move the material through the furnace from the first zone to the nth zone at a generally constant rate. Within each zone of the furnace, the temperature, atmosphere and residence time of the waste material therein is controlled in a manner which is directly correlated to that established by the controlled curve so that very complex organic compounds can be completely volatilized in a controlled manner. This particular feature of the invention is not limited to reclamation but applies generally to any pyrolysis process, preferably toxic and/or hazardous waste such as chemical munitions and the like with waste contained in a drum or containerized feed so that the waste material can be processed continuously, thus obviating the need for processing such materials only in batch type furnaces. In accordance with another aspect of this inventive feature, while time, temperature, atmosphere, etc., are controlled, the only parameter actually measured for control of the process is the oxygen content and temperature of each zone.

Accordingly, another feature of the invention is to semi-continuously process waste material for reclamation purposes and this object is achieved by controlling the endothermic waste sampling step defined above to limit the temperature to be less than that of the critical temperature and then extending the waste sample test in the burnout phase to determine precisely the rate that substoichiometric oxygen is to be metered so that the exothermic reaction can be controlled to occur at a temperature less than the critical temperature. An n+1 zone is then provided in the furnace and the oxygen and residence time of the waste material therein regulated according to the control curve to permit continuous processing of heterogeneous or composite material having a base material and organic compounds in a continuous manner. Again, the only parameters actually sampled in the n+1 zone are the oxygen content and temperature of the zone.

In accordance with a more specific feature of the invention, the furnace is characterized by being barrier free or having no physical barriers between the zones to materially simplify the construction of the furnace. The furnace enclosure extends in a longitudinal direction either in a straight line or rounded in the form of a doughnut and has an entrance end and an exit end. A plurality of discretely placed longitudinally spaced, fan exhaust openings are provided in the furnace enclosure between the entry and the exit end and for each fan opening an associated exit opening in the furnace enclosure transversely spaced therefrom is provided so that each gas exit and associated fan exit provide a furnace zone, there being "n" zones in the furnace as noted above. A drive mechanism is then provided for conveying the waste material from the entry end through the furnace zones to the exit end. The fan in each zone then establishes a recirculating atmosphere comprised principally of the volatiles produced in the endothermic reaction. A portion of the volatiles is immediately drawn from each zone through the gas outlet and the position of the gas outlet in combination with the fan outlet establishes the recirculation pattern for the atmosphere of the zone thereby establishing zone integrity and control. Additionally, the burnout zone at substoichiometric oxygen percentages can be provided adjacent the "n" zone so that no special furnace construction is needed. Optionally, a carrier gas can be introduced in each zone for temperature control. The gas can be the products of combustion from a direct field burner for temperature increase or a cooled gas from the afterburner for temperature reduction purposes. In either event, the carrier gas is a nominally non-reactive, neutral gas. In theory, however, the carrier gas can contain certain gas elements to assist, retard or balance the desired endothermic reaction. Importantly, the non-reactive carrier gas is needed in the burn-out zone to control the exothermic reaction. Specifically, for the n+1 zone, the carrier gas could also contain elements conductive to an endothermic reaction to prevent the temperature from the exothermic reaction from running out of control. A significant feature of the invention then arises from the placement of the furnace zones wherein any deleterious effects from the atmosphere present in the n+1 zone impacts, only partially, the "n" zone with no effect on the first zone, where the initial heating of the waste tends to produce a "runaway" condition.

In accordance with another specific feature of the invention which is especially adapted for use with the zoned gas inlet-outlet feature discussed above, is the containerization of the waste material. More specifically, especially configured containers or trays contain the waste material which, for this particular feature of the invention, is in bulk form. The container retains the material as a fixed, static bed in an enclosure which is open on at least two sides. If needed, the waste material is shredded to provide a uniform bed with a fairly constant pressure drop having an upper limit associated therewith. The trays or containers are designed to substantially fill the furnace enclosure in the space between each fan outlet with its associated gas outlet so that substantially all the atmosphere is transmitted through the static bed to the associated gas outlet thus insuring a high convective heat transfer exchange between the zone atmosphere and the waste material which, in turn, insures faster processing times. More specifically, apparatus of the type described has achieved high convective heat transfer rates typically in the order of 85% with only 15% of the heat transfer occurring by conduction and radiation.

The principal features of the subject invention have been described thus far in terms of a process and it is another specific feature of the invention to provide appropriate conventional control mechanisms, to achieve apparatus which accomplishes the process steps broadly discussed above. Additionally, while the features have been generally described, as stand alone concepts, it is contemplated that any two or more of the features can be combined. That is, semi-continuous processing in combination with thermal reclamation is contemplated, etc.

Accordingly, it is another principal feature of the subject invention to provide a semi-continuous pyrolyzing furnace for treating drummed waste and the like.

It is yet another object of the invention to provide a continuous furnace for reclaiming the base material of a heterogeneous composite material.

Still another object of the invention is to provide a continuous zone furnace which can be programmed to pyrolyze in a controllable manner a large variety of various waste materials.

In connection with the foregoing object, it is yet another object to provide such furnace with an additional option to reclaim the base material of the waste.

Yet another object of the invention is to provide a pyrolyzing furnace which utilizes convective heat transfer to speed the pyrolyzing reaction.

Still yet another object of the invention is to provide a substoichiometric burndown of the fixed carbon to reclaim the base material of the waste.

Yet another broad feature of the invention is to develop a process for reclaiming non-metallic as well as metallic material from a heterogeneous composite material.

Still yet another object of the invention is to provide a continuous pyrolyzing furnace which is characterized by its ability to accurately and precisely control the reactions so to be able to pyrolyze waste material on a semi-continuous basis.

Still yet another object of the invention is to provide a continuous pyrolyzing furnace which can carefully control the endothermic and exothermic reactions occurring within the pyrolyzer by controls which are simple and yet consistently reliable.

Still yet another object of the invention is to provide a continuous pyrolyzing furnace which is simple in design and economical in construction.

These and other objects of the present invention will become apparent to those skilled in the art upon a reading and understanding the following description of a preferred embodiment of the invention.

BRIEF DESCRIPTION OF THE DRAWINGS

The invention may take physical form in certain parts and arrangement of parts, a preferred embodiment of which may be described in detail herein and illustrated in the accompanying drawings which form a part hereof and wherein:

FIG. 1 is a schematic illustration of a gravimetric furnace used to develop the signature heat profile for a waste specimen;

FIG. 2 is a graph of the organic burnoff of various substances plotted as a function of time at a constant temperature;

FIG. 3 is a graph showing the organic residue burnoff at various temperatures plotted as a function of time for one particular substance:

FIG. 5 is a schematic, sectioned elevation view of a continuous furnace constructed in accordance with the principles of the invention;

FIG. 6 is a cross-sectional view of the furnace of FIG. 5 taken along line 6—6 of FIG. 5;

FIG. 7 is a graph illustrating pressure drop through a static bed; and

DETAILED DESCRIPTION

Figure 4:
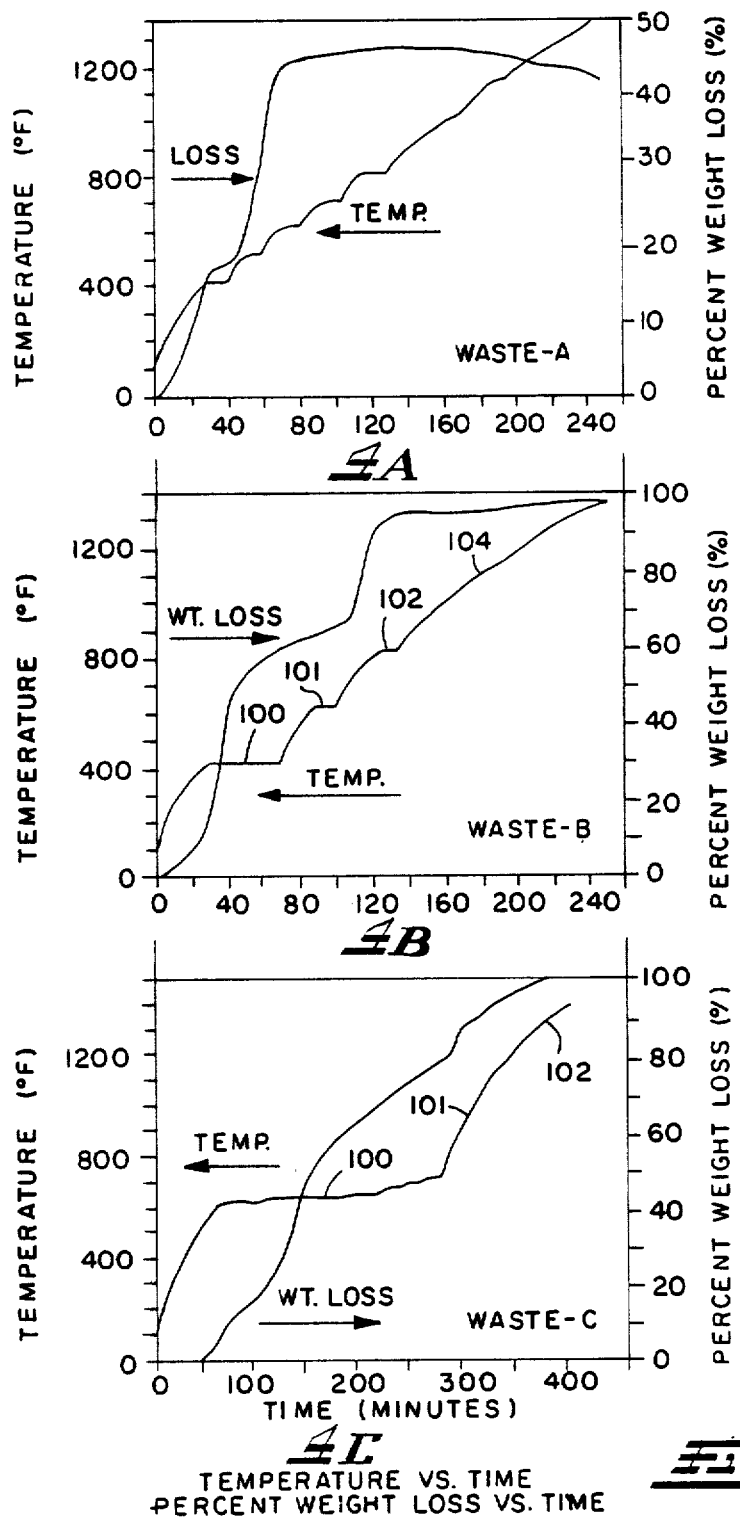
FIG. 4 which comprises FIGS. 4a, b and c are graphs of weight loss versus time and temperature versus time for wastes designated as "a", "b" and "c" respectively.

Referring now to the drawings wherein the showings are for the purposes of illustrating a preferred embodiment of the invention only and not for the purpose of limiting same, there is shown in FIG. 1 in schematic form a thermal gravimetric furnace 10. Thermal gravimetric furnace 10 conceptually comprises a sealed furnace shell 12 which is indirectly heated by electric heating elements 13. A waste sample designated as 15 is placed in thermal gravimetric furnace 10 and accurately weighed by an electronic balance scale 16. Scale 16 in turn is connected to recorder 18 which then keeps a permanent record of the loss in the weight of the sample 15 as it is heated in thermal gravimetric furnace 10. The waste sample 15 can either be a liquid, a sludge or a solid and when it is heated, the organics are distilled or volatilized and the weight of the sample decreases until a residue or char is left. The volatiles driven off are analyzed by means of a gas analyzer 19 and a controller 20 is provided to regulate heating elements 13 and the temperature within furnace shell 12. For purposes of this discussion, controller 20 also regulates an inert purge gas atmosphere, preferably nitrogen 22 through valve 23. Also, a source of oxygen 25 regulated by valve 26 is provided for "burnout" of the residue after the volatiles have been driven off. Gas purge bottle 28 appropriately valved at 29 can be used in addition or instead of nitrogen as the purge gas if desired. All of the components and controls described are conventional and known to those skilled in the furnace trade and thus are not described in further detail herein.

As is known, the chemical reactions during the pyrolysis process involve thermal decomposition, rearrangement of atoms in a molecule and polymerization of smaller molecules. These reactions are very complex and depend upon several factors such as the reaction time, the temperature, the composition of the waste material, catalytic effect which could exist between the container holding the waste and the waste, etc. Generally, the reaction can be expressed as follows:

The point is that there are many different heterogeneous reactions occurring during the pyrolysis process and depending upon the complexity of the waste, the reactions can be competing, reactive or additive within one another at any given reaction time. Thermal gravimetric furnace 10 is used basically to chart the progress of such reactions by measuring the degree of decomposition as a function of time. Thus, FIG. 2 shows the degree of decomposition for various materials identified as a function of time measured by thermal gravimetric furnace 10 when the waste samples are pyrolyzed at a temperature of 800° F. FIG. 3 shows the increase in the rate of decomposition as a function of temperature.

The graphs identified as graphs 4a, 4b and 4c in FIG. 4 illustrate the various time-temperature and residue loss-temperature relationships produced by different wastes identified as "a", "b" and "c" respectively, all of which can be determined by means of thermal gravimetric furnace 10. Any heterogeneous waste can be thus thermally investigated to determine decomposition temperatures, maximum weight loss, weight changes during the process (for example, note the weight gain for waste a) and material behavior and condition. Specifically, the thermal gravimetric furnace 10 is used in the first instance to determine if various heterogeneous wastes can be pyrolyzed in a commercially meaningful sense, i.e. sufficient distillation or volatilization of the organics and then in a second instance, to determine the optimum processing time. Once the time-temperature curve has been established for the particular waste to be pyrolyzed, this becomes a "signature" which is programmed into the heating curve employed in a full sized batch furnace for pyrolyzing the waste. More particularly, the heat input to the furnace chamber of the batch furnace is programmed on a timed basis to duplicate the "signature" established by thermal gravimetric furnace 10. An overriding control used in the batch pyrolyzer is a temperature sensor. If the temperature begins to exceed, for whatever reason, the signature temperature the heat input is reduced in the first instance, and to this extent the "signature" is overridden. Once the system is under control, the "signature" profile, is again actuated. An oxygen sensor is also used as an overriding control. If the oxygen content begins to approach the Lower Explosive Limit, a sprinkler system is actuated to override or shut down the entire system to prevent a "runaway" situation from occurring. In practice, a temperature sensor which works in connection with the afterburner may also be used to retard the system heat to prevent a "runaway" because of foreign material present in the actual waste not present in the sample. Once the volatilization is complete, it is conventional to add excess air to the batch furnace chamber and incinerate or burn out the fixed carbon residue or char. As noted, this typically occurs at temperatures in excess of 1500° F. and is an optional step. The pyrolysis system described thus far is conventional in that the inventors have successfully applied such concepts in pyrolyzing batch type furnaces.

It is one of the features of the present invention to adapt the pyrolyzing process so that the process can be used to reclaim a desired material or, as used herein, the base material, from a heterogeneous material which includes organic compounds as one of the elements of the heterogeneous or composite material. In each instance, the recoverable material or the base material must have, what is herein defined as a "critical temperature" which is higher than the volatilization temperature of the organic compounds of the composite material. The critical temperature is defined herein to mean the softening temperature in the case of metals, i.e. the temperature at which the metal becomes plastic or, in the case of a non-metallic base material, the temperature at which the non-metallic material melts, fuses together or ignites. Examples of materials which can be thermally reclaimed according to the present invention are set forth below.

| COMPOSITE NAME | Roofing Shingles | Fiberglass Insulation |
|---|---|---|
| BASE MATERIAL | Limestone-Fiberglass | Glass Fiber (Wool) |
| ORGANIC COMPOUNDS | Tars | Phenol-Formaldehyde Resin |
| CRITICAL TEMP. OF BASE | 1800° F. | 1200° F. |

|  | -continued | |
| --- | --- | --- |
| VOLATILIZATION TEMP. | 500° F. | 700° F. |
| COMPOSITE NAME | Printed Circuits | Scrap Wire |
| BASE MATERIAL | Glass Fiber (Silica Mat) | Copper Wire |
| ORGANIC COMPOUNDS | Resin | Polyethylene/Paper |
| CRITICAL TEMP. OF BASE | 1500° F. | 1200° F. (hardening) |
| VOLATILIZATION TEMP. | 600° F. | 700° F. |

As noted in the Hazzard patent discussed above, it is known that pyrolysis can be used to recover metallics from the waste material and as the inventors noted in their AICnE paper of Mar., 1987, it is possible to use pyrolysis to recover non-metallic base material in that the organics, i.e. the binder in fiberglass insulation, could be volatilized without melting the base material. Specifically, the endothermic reactions can be controlled at a temperature less than critical but at a sufficient temperature to allow the endothermic reactions to proceed to completion in the sense that all organic compounds were volatilized. Accordingly, no claim is made herein that the inventors are able to successfully recover a non-metallic base material from a composite material by pyrolyzing the organics. What the inventors did discover, however, when the volatiles were burned off from some non-metallic base materials and from some metallic base materials was that the fixed carbon present at the surface of the base material, believed present either in the form of a carbon dissolved into the surface of the material or as a polymer bonded to the material, prevented the recovery of the base material in its pure form and accordingly diminished the commercial value of the process. When the fixed carbon was attempted to be removed by conventional excess air burnout, the base material melted or excessive oxidation was present. After several unsuccessful attempts to recover the base material in a substantially pure form, it was discovered through experimentation with thermal gravimetric furnace 10 that it was possible to control the exothermic reaction in the burnout stage by metering very small amounts of oxygen and specifically oxygen at substoichiometric rates (as defined above) such that the temperature of the exothermic reaction could be controlled so that the exothermic reaction did not proceed to an incineration temperature, i.e. in excess of 1500° F. and did not exceed the critical temperature of the base material and that, it was possible at such low temperatures, to remove the fixed carbon and importantly to do so without significant loss of the base material in the form of base material oxides, present in the starved air processes noted above. Accordingly, by thus controlling the exothermic step, it is possible to recover in a substantially pure form, the base material of a composite containing organic compounds by a process which first uses pyrolysis to volatilize the organics and then controls the oxygen and the attendant temperature increased in the exothermic step to slowly burn off the fixed carbon present in the residual waste. It is possible, for some wastes, to even recover the base material in its pre-elemental form. Specifically, the oxygen content in the atmosphere is ideally maintained at no more than about 2-3% and does not exceed 4% by weight of the atmosphere so that an explosive mixture does not, at any time, arise during the process. Whether this step is or is not pyrolysis is essentially a matter of definition. Burn-out is typically an incineration step by definition. That is, the temperature is above 1500° F., and the exothermic reaction requires oxygen in concentrations higher than the L.E.L. In applicant's process, the burn-out temperature is typically less than 1500° F. and the oxygen concentration less than the L.E.L. However, the reaction is exothermic rather than endothermic and because pyrolysis is typically associated with endothermic reactions where oxygen is not supplied, applicant's view their burn-out step as incineration even though controlled to behave in a pyrolysis-like manner. It will be appreciated by those skilled in the art that the burn-out step disclosed herein can have application to batch as well as continuous and semi-continuous processes.

Referring now to FIGS. 5 and 6, there is shown, in generally schematic form, a semi-continuous pusher tray furnace 40. Pusher tray furnace 40 has a charge vestibule 42 for charging the waste to its entrance end 43 and there is a discharge vestibule 45 connected to the exit end 46 of pusher tray furnace 40 for discharging the treated waste. Baskets 50 are conveyed by hydraulic and/or electrical/mechanical drive arrangements conventional in the art to charge table 51 where they are conveyed two abreast into charge vestibule 42 which is a sealed vestibule and from which an appropriate purge gas is supplied to rid the vestibule of any atmospheres. A sealed furnace door 53 provides communication between a furnace chamber 55 and charge vestibule 42 and at the appropriate time, a drive mechanism 52 on charge table 51 moves two baskets 50 into furnace chamber 55. Furnace chamber 55 as best shown in FIG. 6 is rectangular in cross-section and preferably extends in a straight longitudinal direction. However, a rotary hearth or a doughnut shaped arrangement can be alternatively employed. Baskets 50 rest on rails or skids 56 which extend the length of furnace chamber 55 and suspend baskets 50 midway within furnace chamber 55 for reasons which will be explained hereafter. Hydraulically actuated push rod 58 pushes baskets 50 toward exit end 46 of pusher tray furnace 40. The stroke of push rod 58 is at least equal to the width of baskets 50. Discharge vestibule 45 is similar in operation and construction to charge vestibule 42 and is in fluid communication with exit end 46 of pusher tray furnace 40 by means of an exit furnace door 47. Discharge vestibule 45 is also in communication with a discharge table 48 and is similarly provided with purge gas to prevent oxygen entering furnace chamber 55 from discharge vestibule 45.

With furnace chamber 55 fully loaded with baskets 50 as shown in FIG. 5, discharge vestibule 45 is purged with an appropriate gas and exit furnace door 47 is opened. Drive mechanism 49 on discharge table 48 transfers two side-by-side baskets 50 from furnace chamber 55 to discharge vestibule 45 and then furnace door 47 is sealed. Push rod 58 is actuated to move all baskets 50 in furnace chamber 55 towards exit end 46 a distance equal to the width of basket 50 and is then retracted. The charge vestibule 42 is appropriately purged with a gas and entrance furnace door 53 is opened. Drive mechanism 52 is actuated to move baskets 50 into the space previously occupied by the two baskets which have now been indexed a basket width space toward exit end 46. Pusher tray furnace 40 is semi-continuous in operation in that two baskets 50 are retracted while two fresh baskets 50 are loaded at discrete intervals. The work or waste is treated as it travels from entrance end 43 to exit end 46. As defined thus far, pusher tray furnace 40 is somewhat conventional in the industrial furnace art.

Referring still to FIGS. 5 and 6, baskets 50 or alternatively trays or even perforated drums, are open sided containers defined by a wire mesh 60 on at least two opposing sides of basket 50. In the embodiment under discussion, the waste material to be treated is a solid and the screen size of mesh 60 is small enough to retain the particles of the solid waste under treatment. In the basket 50 illustrated in FIG. 6, the top 61 and bottom side walls of basket 50 are constructed of wire mesh 60 while the end walls 63 and lateral side walls 64 of baskets 50 could be solid or, alternatively, the entire basket 50 could be constructed of wire mesh 60. The dimensions of each basket 50 are carefully sized relative to the solid waste material particulate size for reasons which will be described hereafter.

In addition, the spacing between longitudinal side walls 68, 70 of furnace chamber 55 is such as to almost equal the overall width of a pair of side-by-side baskets 50 so that baskets 50 when placed within furnace chamber 55 as shown in FIG. 5, substantially occupy all the space between longitudinal furnace side walls 68, 70 over the entire length of furnace chamber 55.

Spaced at discrete intervals along the length of furnace chamber 55 are a plurality of furnace zones numbering "n" in number. In the embodiment shown in FIG. 5, there are four zones which are numbered from the first zone adjacent entrance end 43 consecutively as 75, 76, 77, and 78. Each furnace zone is defined by a fan 80 having a fan outlet 81 which is precisely positioned relative to baskets 50 and an exhaust outlet 85 from which an exhaust header 82 extends and exhaust outlet 85 is positioned precisely relative to fan outlet 81. Also, a burner 83 which is operated at or slightly less than stoichiometric fuel-air ratios is provided for each zone and each burner 83 is directed to fire its products of combustion into its respective zone 75-78. The outlet 81 of fan 80 and exhaust header 82 is shown in FIG. 6 to be positioned so that the fan outlet is beneath basket 50 while exhaust header 82 is above basket 50. The positions can be reversed. Importantly, fan outlet 81 is on one side of the waste while exhaust outlet 85 is on the opposite side of the waste so that the draft induced by exhaust outlet 85 causes fan flow through the work. To assure flow throughout the basket bed, fan inlet 81 is positioned on one lateral side of basket 50 while exhaust outlet 85 is somewhat adjacent the opposite side of basket 50. One exhaust outlet 85 is shown for simplicity. Multiple outlets and various fan header configurations can be employed to achieve the desired fan flow recirculation pattern in the zone. Finally, each fan 80 and burner 83 for each zone are shown positioned in a recess 86 formed in one of the longitudinal side walls 70. A plate acting as a baffle 88 (which may or may not be insulated and is not shown as insulated) is provided at the end of each recess 86 and a burner opening 84 as well as the fan outlet 81 is provided in each baffle 88. In addition, an opening, not shown, adjacent the top of the basket is provided in baffle 88 for recirculating a portion of the volatiles back through fan 80. Baffle 88 extends the straight line continuity of furnace chamber longitudinal side wall 70. While preferred, baffle 88 is not necessary, and in some applications it may be desirable to leave recess 86 open so as to provide an additional volume adjacent each zone to enhance recirculation of the atmosphere back through fan 80 in each zone.

Adjacent the "n" furnace zone, furnace zone 78, is an n +1 furnace zone or exothermic zone 90 which is adjacent furnace exit end 46. Exothermic zone 90 is similar in construction to endothermic zones 75-78 except that its recess 86 is formed in the exit end wall 57 of furnace chamber 55. In addition, a source of oxygen 92 is provided for exothermic zone 90.

The pusher tray furnace 40 described thus far is ideally suited to reclaim a base material from one particular type of a solid heterogeneous composite material such as defined above. The organic compounds within the composite is volatilized in an endothermic reaction as the composite material sequentially passes through furnace zones 1 through n, i.e. endothermic zones 75-78. The fixed carbon remaining on the base material is burned out in zone n+1, i.e. exothermic zone 90. In order that the length of the furnace be kept to a minimum (and thus reduce the construction cost of the furnace as well as to minimize processing time and also, incidentally, to assure meeting oddly stepped signature heat profiles) it is essential that the composite waste material be quickly brought to its desired temperature in each zone. Heretofore, the waste material pyrolyzed in batch type furnaces was conventionally treated in drums which were usually punctured to allow volatiles to escape. The heat transfer was principally affected by conduction and radiation and this occurred whether indirect heating or direct firing by burner was utilized and even though the batch furnaces were fitted with fans and, of course, an exhaust outlet for take off of the fumes. It has been determined that by accurately sizing baskets 50 relative to the density and particulate size of the composite waste material a static bed can be consistently achieved on a commercial basis with a minimal pressure drop so that the composite material could be uniformly treated from top to bottom and side to side throughout the bed, i.e. basket depth. Importantly, the heat transfer in each furnace zone could then be controlled principally by convective heat transfer. Uniformly consistent convective heat transfer ratios of approximately 85% versus 15% attributed to radiation and conduction have been achieved by regulating the velocity of the atmosphere flow through the static bed at a velocity which does not produce more than about 3/10 inch difference in water column pressure through the bed. The pressure drop through the bed is obviously dependent upon the density of the material in the bed, and the dimension of the bed, and also the changes in the material during the process insofar as such changes relate to density and bed dimensions. For a composite waste material having a density of approximately 1.5 pounds per cubic foot, FIG. 7 shows that fan 80 can be operated to produce flows through the bed of anywhere between 40 to almost 100 feet per minute to achieve high heat transfer by convection, i.e. in the range of 85%. It is to be noted that the velocities shown, while fairly high, do not approximate a jet stream. (Also, it should be noted that drummed wastes, containing semi-viscous material can be employed in the present invention by piercing the container and then orientating the container relative fan outlet 81 and exhaust outlet 85 to achieve atmosphere flow through the punctured drums. This application, however, will not achieve the high convective heat transfer rates achieved in the preferred embodiment.)

Figure 8:
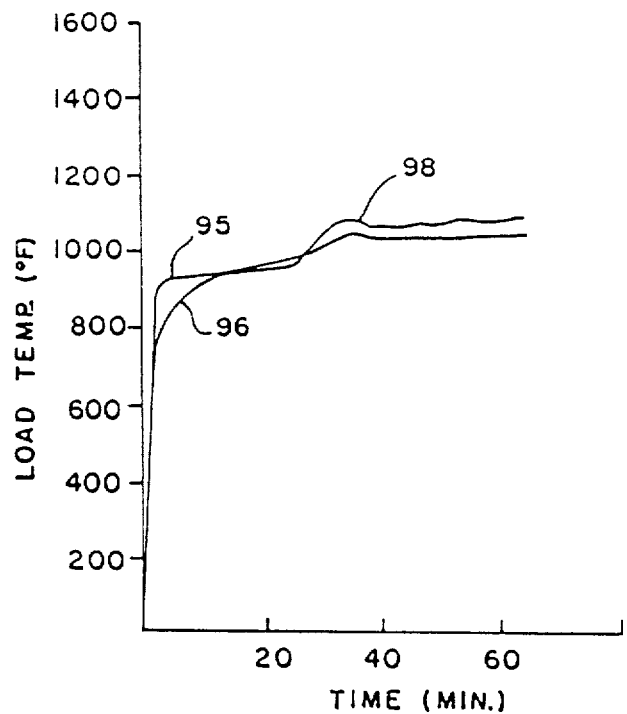
FIG. 8 is a graph showing temperature deviation within the bed.

FIG. 8 shows the time temperature heating curve of a composite fiberglass base material heated in the static bed of basket 50 within the pressure drop and velocity limitations noted in FIG. 7. The uppermost curve designated as 95 represents the bottom of the bed which is first subjected to the fan flow while the bottom curve 96 represents the top of the bed where maximum pressure drop has occurred. The curves closely parallel each other for the particular composite waste treated and show that adequate and complete thermal processing of the waste occurs throughout the bed. More particularly, it should be noted that the greatest point of divergence within the bed begins to occur during the burnout of the fixed carbon while the exothermic reaction is occurring with substoichiometric metered amounts of oxygen as described above. That is, the static bed can be more easily controlled in the endothermic pyrolyzing stage than in the exothermic stage. This indicates why certain granular solid wastes which do not have exotic, thermal gravimetric temperature curves can be pyrolyzed in rotary kilns where all that is performed is the endothermic reaction. That is, rotary kilns employing Archimedes' screw principles to convey the waste, tumble the beds and do not maintain a static bed. Similarly, in vertical shaft and sliding bed furnaces, the bed is not constant. In certain endothermic reactions for certain wastes, a tolerance for the varying beds exists. However, for other wastes or when the burn-out is considered, the tolerance diminishes and the static bed concept becomes critical in controlling the convective heat reaction.

Referring back now to FIGS. 5 and 6 it has been determined that by positioning the exhaust outlet 85 relative to fan outlet 81 in the manner described, the atmosphere within the volume of the furnace adjacent exhaust outlet 85 will be drawn through those baskets 50 adjacent that particular fan outlet 81 exhaust outlet 85 combination and a portion of that atmosphere will be exhausted and a portion will be recirculated back again through the basket to effect convective heat transfer with the composite waste contained therein. The portion of the atmosphere which is recirculated back establishes a closed recirculation loop through the four baskets adjacent each zone's exhaust outlet 85 and this loop is effective to establish discrete furnace zones between adjacent exhaust outlets 85. While the zones are discrete in the sense that for the velocities noted in FIG. 7, temperature differentials within approximately 25° F. can be maintained between adjacent zones, the zones are not entirely impervious to some interchange of atmosphere between adjacent zones. That is, the zones do not establish temperature boundaries to the extent established by use of free standing jets as disclosed in U.S. Pat. No. 3,819,323 to Hemsath. For this reason, the zone concept defined herein is not particularly suited for continuous furnaces in the industrial heat treat art where very accurate control of the gas composition must be maintained. However, it is the temperature and time during the endothermic reaction which is controlled and the particular major concern is the oxygen content present during the endothermic reactions not exceed the L. E. L. As noted above, the oxygen content is a major concern in the exothermic reaction also. Thus, not considering any inherent leakage of air into furnace chamber 55 attributed to furnace construction, if "system" oxygen by percent weight of atmosphere was admitted into the "n+1" zone at a 2% concentration, it is possible that there might be some drift of the system oxygen into the "n" endothermic zone at the interface therebetween so that, say ½% of the atmosphere within zone "n" might be system oxygen which would then amount to ½% of the atmosphere in zone "n−1", etc. This does not seriously affect the controllability of the endothermic reactions so long as the oxygen content in the n+1 zone is controlled. Importantly, it has been discovered that, in almost all waste samples, the presence of some small amounts of system oxygen is desirable just prior to the burn-out stage in that it is believed that some minor traces of the oxygen actually assist or aids the proceeding of the endothermic reaction to completion. What cannot be tolerated is the presence of system oxygen at the initial entry zones. The entry zone is where the waste is initially brought up to pyrolyzing temperature, and once the water vapor is driven off, there is a distinct tendency for the runaway to occur in many wastes. Oxygen, at this point in the cycle, is obviously undesirable. The present invention somewhat uniquely provides for this by introducing the air in the n+1 zone and then utilizing the system air vis-a-vis the zones established. Those skilled in the art will note that the use of other furnace zone principles in the furnace art may, besides increasing the cost of the furnace, establish a zone integrity which is too tight for the pyrolyzing application.

Referring now to FIG. 4, there are essentially two methods which can be employed to size the semi-continuous pusher tray furnace 40 to control the endothermic reactions to completely volatilize the composite waste material. One method is to simply divide the total volatilization, endothermic reaction period by the number of endothermic zones arbitrarily selected for the pusher tray furnace 40, i.e. conceptually two, but as a practical minimum, three. The signature heat profile, i.e. the time-temperature curve established by the thermal gravimetric furnace 10 is then divided into equal time increments corresponding to the number of zones established and the burner 80 of each zone (and the fan flow, if needed) programmed to produce that portion of the signature heat profile curve. This approach may be all that is required for a number of waste compositions. It has the advantage that each zone is operated for the same time period at maximum convective heat transfer rates. Also, assuming that the furnace has been sized with a sufficient number of zones, a number of different waste compositions can be processed. However, such as that shown in FIG. 4 there may be requirements to abruptly stop or plateau the reaction within a given zone. Accordingly, some judgmental factor should be exercised in sizing the number of zones in the furnace desired for the particular waste material treated by considering the temperature requirements for each zone correlated to the signature profile curve. This is especially important when the furnace is being designed for a dedicated facility reclaiming only one base material. Ideally, a zone could be established for every 200°-300° F. temperature rise in the waste excluding, possibly, the first zone whereat ideally, the temperature of the waste material is raised from ambient to pyrolyzing temperature. Because this will result in unequal time increments, the fan flows may then be varied to control the reaction rates (as well as burner firing). For example, for waste B shown in graph 4b two zones might be established to duplicate that portion of the curve indicated by numeral 100, one zone each for numerals 101 and 102 and two zones for numeral 104. For treating waste C four zones might be established to duplicate that portion of the signature heat profile curve designated by numeral 100 and one zone each might be established to duplicate that portion of the heat profile curve designated by numerals 101 and 102. It should be noted that the temperature curve shown in FIG. 4 is the temperature of the composite waste material and not the temperature of the atmosphere. Again, the high heat transfer coefficients achieved with the present invention will produce a significant temperature ramp in actual practice when compared to that produced by the bench test conducted on the indirectly heated thermal gravimetric furnace. This means the burners may be intermittently fired with the temperature being held at the set point, etc. Also, the fan speed may be varied to control the reaction rate. Ideally though, a steady state condition is desired. Note also that the curves shown in FIG. 4 are only the endothermic reaction curves and reference to FIG. 8 should be had for signature heat profile curve for the fixed carbon burnout.

Referring again to FIGS. 5 and 6, in the exhaust header of each zone there is provided a temperature sensor 110 and an oxygen sensor 111 which in turn are connected to a controller 113 which controls the firing of burner 83. Controller 113 can also control the speed or flow rate produced by fan 80. As noted above, controller 113 is programmed to fire each burner 83 in accordance with a pre-programmed firing curve established in accordance with the signature heat profile for that particular zone. Along with the burner firing, the fan speed and back pressure within any particular zone is also controlled. In addition, a system temperature sensor 115 is also provided to measure the exhaust gases leaving an afterburner 116 which will be subsequently defined. If the temperature recorded by temperature sensor 110 exceeds that established by the signature heat profile curve or if the temperature reported in system sensor 115 exceeds an upper limit programmed in to controller 113, the program is overridden and the firing rate of burner 83 is cut back (or if the zone is not in a firing mode, the fan speed increased to exhaust a layer quantity of volatiles) to prevent a runaway from occurring in that zone and if the temperature rise still continues, the system is shut down. In addition, if the oxygen content measured by oxygen sensor 111 exceeds the predetermined limit, which is set less than the L. E. L. and is typically established at 4%, the system is shut down. Shut down can be effected by a conventional water sprinkler system (not shown) also actuated by a controller 113. The control arrangement described for the endothermic reaction zones also exists for the exothermic reaction zone 90 with an additional control feature regulated by controller 113 which meters the oxygen supplied to exothermic zone 90 from the oxygen source 92. This is all that is essentially required to control pusher tray furnace 40.

However, there are some additional features schematically disclosed in FIG. 5 which enhance the operation of pusher tray furnace 40. As shown in FIG. 5, the volatiles collected in exhaust headers 82, including the exothermic reactants from zone n+1, are collected in a common header, 120, passed through a conventional scrubber or filter 121 and then incinerated in a conventional afterburner 118 before exhausting to the atmosphere through stack 119. A portion of the incinerated gases can be passed through a heat exchanger 125 and the cooled or the hot gases either upstream or downstream of afterburner 118 can function as a purge gas for vestibules 45, 50 (This connection is not shown). However, the cooled gas leaving heat exchanger 125 (or the gases at a fixed temperature) can be piped back through burners 83 and used in the endothermic reaction zones to dilute the volatile stream being giving off by the waste and, further, to assist in the control of the temperature for that particular endothermic zone. The concept of using a carrier gas, however, at optionally a differential and preferably a lower temperature, is of greater concern when used to control the exothermic reaction occurring in the exothermic zone 90 and it is a specific feature of this invention to use such a gas to control the exothermic reaction.

More specifically, the carrier gas introduced into the furnace, and especially as used in the exothermic zone would have the following composition:

| ELEMENTS | CARRIER GAS PREFERRED | RANGE |
|---|---|---|
| $N_2$ | 71% | 70-80% |
| CO | 0 | 0-5% |
| $CO_2$ | 9.2% | 6-12% |
| $O_2$ | 0 | 0-0.5% |
| $H_2O$ | 19.2% | 10-20% |
| Balance | — | — |

In concept, it is also possible to add a reactant to the carrier gas to assist or retard the reaction. This can be done for either the exothermic or endothermic zones and is used in the exothermic zone. For example, water gas makes up a portion of the carrier gas and is injected into the exothermic zone. Should the exothermic reaction begin to exceed 1400° F., the water gas shift reaction begins to occur and this is an endothermic reaction which "absorbs" the heat given off by the exothermic fixed carbon reaction. The competing reactions are then balanced to control the overall temperature in the n+1 zone. In this respect, the other elements of the carrier gas, i.e. CO and $CO_2$ are also controlled.

Control is achieved by means of controller 113 regulating valves 126 controlling the flow of the gases from afterburner 125 to burners 83. Similarly, valves 127 may also be applied in exhaust headers 82 and similarly controlled by controller 113 to control the volume of the volatiles leaving any particular zone. As the flow is closed, the back pressure increases which in turn increases the recirculation of the volatiles within the zone enhancing the zone barriers between adjacent zones. All the controls desired and mentioned can be affected by programmable, microprocessors conventional in the trade and thus not described or discussed in detail herein.

The invention has been described with reference to several different distinct features and embodiments thereof which features include but are not limited to:

(a) The concept of controlled exothermic burnout of the fixed carbon which is applicable not only to the continuous furnace disclosed, but also in theory to batch furnaces and even to drum waste where reclamation of the base material in a substantially pure form is desired;

(b) The concept of a semi-continuous furnace, round or straight, using discrete barrier free, zones to pyrolyze waste per se and in combination with a further modification to include an n+1 zone for incineration or controlled fixed carbon burnout to permit reclamation of the base material;

(c) The concept of a static bed to achieve control of the pyrolysis of a solid composite waste principally by heat convection by itself and also in combination with controlled fixed carbon burnout for reclamation purposes;

(d) The control mechanism for the foregoing semi-continuous furnace including modification of the signature heat profile to be used in sizing and controlling the operation of the furnace.

It is our intention to include all such features and combinations thereof and modifications to any and all such features which are readily apparent to those skilled in the art insofar as they come within the scope of our invention.

Having thus described our invention, we claim:

1. A thermal reclamation process for recovering a base material from a composite material including said base material and organic compounds, said base material having a critical temperature higher than the volatilizing temperature of said organic compound, said process including the steps of:

(i) heating said composite material by controlling the temperature of the atmosphere in the furnace enclosure to produce an endothermic reaction of said organic material, said endothermic reaction occurring at a temperature less than said critical temperature;

(ii) continuing said endothermic reaction until substantially all the organic material has been volatilized and said composite material is transformed into fixed carbon and said base material;

(iii) providing a substoichiometric concentration of oxygen to said atmosphere to produce an exothermic reaction between said atmosphere and said fixed carbon sufficient to maintain the temperature of said exothermic reaction to be less than said critical temperature, and (iv) continuing to supply said substoichiometric concentration of oxygen to permit said exothermic reaction to proceed until substantially all of said fixed carbon becomes associated with said atmosphere whereby said base material may be recovered in a substantially pure form.

2. The process of claim 1 wherein said oxygen is supplied to said atmosphere in a volume fraction significantly less than that of air to said fixed carbon so that the exothermic oxidation reaction can proceed to completion without overheating the base material.

3. The process of claim 1 wherein said process includes placing at least two containers in said furnace enclosure without any physical barriers therebetween and simultaneously processing said exothermic step in one of said containers while said endothermic step occurs in the other container.

4. The process of claim 1 wherein the oxygen content in said atmosphere does not, at any time, exceed the lower explosive limit and become an explosive mixture within the atmosphere.

5. The process of claim 1 wherein the oxygen content of said atmosphere in said endothermic step does not exceed about 2% of the atmosphere and the oxygen content of said atmosphere in said exothermic step does not exceed about 4% of the atmosphere.

6. The process of claim 1 wherein said process includes placing said composite material in an open sided container, circulating said atmosphere in convective heat transfer with said material in said container and packing said material in said container to produce a minimal pressure drop from one end to the other end of said container as said atmosphere passes therethrough.

7. The process of claim 6 wherein said pressure drop does not exceed about 2" water column.

8. The process of claim 6 wherein the heat is removed from said fixed carbon and heat imparted to said composite material is attributed to 15% by radiation and conduction and 85% by convection.

9. The process of claim 8 wherein no more than about 20% of the heat removed from said fixed carbon is attributed to radiation and conduction.

10. The process of claim 3 wherein said oxygen is supplied to said atmosphere in a volume fraction significantly less than that of air to said fixed carbon so that the exothermic oxidation reaction can proceed to completion without overheating the base material.

11. The process of claim 10 wherein the oxygen content in said atmosphere does not, at any time, exceed the lower explosive limit and become an explosive mixture within the atmosphere.

12. The process of claim 11 wherein the oxygen content of said atmosphere in said endothermic step does not exceed about 2% of the atmosphere and the oxygen content of said atmosphere in said exothermic step does not exceed about 4% of the atmosphere.

13. The process of claim 12 wherein said atmosphere is circulated in convective heat transfer with said material in said container and said material is packed in said container to produce a minimal pressure drop from one end to the other end of said container as said atmosphere passes therethrough.

14. The process of claim 13 wherein said pressure drop does not exceed about 2" water column.

15. The process of claim 14 wherein the heat is removed from said fixed carbon and heat imparted to said composite material is attributed to 15% by radiation and conduction and 85% by convection.

16. The process of claim 15 wherein no more than about 20% of the heat imparted to said fixed carbon is attributed to radiation and conduction.

17. The process of claim 1 wherein said furnace enclosure has a series of zones numbered from a first zone adjacent the entry end to an n+1 zone adjacent the exit end of said furnace, and providing a plurality of open sided containers adjacent one another and conveying said containers through said furnace enclosure from the first zone through said n+1 zone;

conducting said exothermic reaction in said n+1 zone only and sequentially controlling said endothermic reaction in said zones numbered from one to n.

18. The process of claim 17 further including the steps of providing an exhaust fan opening in each zone, providing means to supply a carrier gas in said n+1 zone and controlling the atmosphere of each zone independently of the other zone solely by means of controlling the exhaust fan, said furnace enclosure having no restrictions formed therein.

19. The process of claim 18 further including the step of independently controlling the temperature of each zone.

20. The process of claim 18 wherein said carrier gas has the following range of compositions:

| | |
|---|---|
| $N_2$ | 70-80% |
| CO | 0-5% |
| $CO_2$ | 6-12% |
| $O_2$ | 0-0.5% |
| $H_2O$ | 10-20% |

-continued

| Balance | — |
|---------|---|

21. The process of claim 17 wherein said exothermic step occurs in said n+1 zone and said endothermic reaction progresses to completion in said zones beginning with zone one and continuing until complete in said n zone.

22. The process of claim 21 wherein said oxygen content in zone n+1 does not exceed about 4% and said oxygen content in all other zones does not exceed about 2%.

23. The process of claim 22 further including the steps of providing an exhaust fan opening in each zone, providing means to supply a carrier gas in said n+1 zone and controlling the atmosphere of each zone independently of the other zone solely by means of controlling the exhaust fan, said furnace enclosure having no restrictions formed therein.

24. The process of claim 23 further including the step of independently controlling the temperature of each zone.

25. The process of claim 24 further including the step of carrying the carrier gas to substantially flow said container before entering said exhaust opening.

26. A process for thermally destroying at least the organic compounds of a waste material comprising the steps of:
   (a) heating a sample of said waste material in the substantial absence of oxygen at varying temperatures and time periods while recording the weight of the volatiles given off until said organic compounds of said waste material have been substantially volatilized without igniting said sample to define a sample pyrolyzing cycle;
   (b) plotting said temperatures recorded in said cycle as a function of time to define a control curve, and dividing said curve over said time into a discrete number of segments with the first segment at the beginning of the cycle and the $n^{th}$ segment at the end of said volatilization cycle;
   (c) providing a furnace having an entrance end and an exit end and n zones therebetween generally equal in number to said n segments; with the first zone adjacent said entrance end and the $n^{th}$ zone somewhat adjacent said exit end;
   (d) providing conveying means for incrementally moving said composite material through said furnace from said first zone through said $n^{th}$ zone;
   (e) controlling the temperature during the time said waste material stays within each zone in a manner correlated to the time-temperature relationship established by said control curve for each zone whereby complex organic compounds can be substantially volatilized in a controlled manner.

27. The process of claim 26 wherein said material is a composite material having a non-organic base material, said steps a–g producing fixed carbon attached to said base material and further including the step of
   (f) providing at least one, n & 1 zone adjacent said exit end; providing oxygen in a substoichiometric amount to said composite material sufficient to permit an exothermic reaction between the furnace atmosphere and the fixed carbon remaining from said volatilized organic compound whereby said base material is reclaimed in a substantially pure form.

28. The process of claim 27 wherein said container means includes a plurality of open ended containers, and said furnace is provided with fan means in each zone for circulating the furnace atmosphere through said containers without significant pressure drop as said atmosphere passes through each container.

29. The process of claim 28 wherein said heat from the atmosphere is imparted to said composite material in a substantially convective manner.

30. The process of claim 29 wherein said furnace is provided without any substantial physical barriers to define said zones, said oxygen content of said furnace atmosphere being greatest in said n & 1 zone and diminishing in each zone to a minimum at said first zone.

31. The process of claim 30 wherein said furnace is operated at negative pressure; said oxygen content in said N & 1 zone lesser than the lower explosive limit and said oxygen content in said first zone no more than about 2%.

32. The process of claim 26 where the number of segments is arbitrarily determined and equal at least two in number.

33. The process of claim 26 where a segment is established for each 200°–300° F. rise in the temperature of said waste material with the possible exception of the first zone.

34. A pyrolysis system for thermally treating a composite material which includes at least one organic compound, said system comprising:
   a furnace enclosure substantially free of any physical barriers therein and having an entry end and an exit end;
   a plurality of discretely placed, longitudinally spaced exhaust openings in said furnace enclosure between said entry and exit ends, and for each exhaust opening, fan means for directing a stream of atmosphere through a fan outlet situated relative to said exhaust opening, each fan outlet opening with its associated exhaust opening defining a furnace zone so that a plurality of furnace zones extend from said entry to said exit end, said fan means effective to cause said atmosphere to circulate in each zone to establish each zone as a discrete, independently controlled zone;
   burner means associated with each zone for controlling, to some degree, the temperature of said atmosphere in each zone;
   container drive means for conveying said composite material from said entry end through said furnace zones to said exit end;
   microprocessor means for controlling the temperature and said fan means in each zone to insure an endothermic reaction principally by a convective heat transfer reaction in all said furnace zones whereby said organic compound is volatilized at different controlled rates while said composite material is conveyed through said furnace.

35. The system of claim 34 further including providing an additional zone adjacent said exit end;
   means for introducing a metered amount oxygen in said additional zone;
   said microprocessor means also controlling said oxygen means to insure an exothermic reaction in said additional zone at substantially substoichiometric conditions whereby any fixed carbon remaining from said organic compound becomes thermally associated with the atmosphere in said additional zones.

36. The system of claim 35 wherein said container drive means maintains said composite material as a fixed static bed.

37. The system of claim 34 wherein a carrier gas is introduced into said additional zone, said carrier gas is a substantially neutral gas.

38. The system of claim 35 wherein said microprocessor means controls system oxygen in said additional furnace zone so that any system oxygen at said entry end does not exceed about two percent of said carrier gas composition in said entry zones.

39. The system of claim 38 wherein said container drive means further includes a plurality of open sided containers with one open side positioned in fluid communication with said gas exhaust opening and the opposite end in fluid communication with said fan outlet opening, mesh means within said containers to maintain said composite material within said container, and said fan means effective to circulate said carrier gas through said container in substantially convective heat transfer relationship with said composite material.

40. The system of claim 37 wherein said fan means is effective to circulate said carrier gas through said composite material without any significant pressure drop.

41. A process for thermally decomposing at least a portion of a solid waste composite material comprising the steps of:
(a) providing a plurality of tubular containers having at least two opposing gas pervious side walls;
(b) placing said composite material in said containers at a predetermined depth to achieve a predetermined density, including the additional step, if necessary, of modifying said composite material to achieve said predetermined density;
(c) providing a furnace enclosure with an entry end and an exit end, said enclosure having, at discrete positions therealong, atmosphere exhaust openings and a fan exhaust opening associated with each atmosphere exhaust opening, said containers positioned so that one gas pervious side wall is adjacent said atmosphere exhaust opening and said opposite gas pervious side wall is adjacent said fan exhaust opening;
(d) indexing said containers through said furnace enclosure with each container stopped for a predetermined time period adjacent each gas exhaust and fan exhaust opening;
(e) providing a burner adjacent each gas exhaust and fan exhaust opening; and
(f) controlling the flow of the furnace atmosphere through said tubular members and the temperature of said atmosphere by said burner at each exhaust gas opening and exhaust fan opening during said predetermined time period to insure a substantially convective heat transfer between said waste material and said furnace atmosphere while said temperature is controlled to achieve successive pyrolyzation of said waste as said containers are indexed through said furnace enclosure.

42. The process of claim 41 wherein said furnace atmosphere at the last exhaust gas outlet adjacent said exit end is provided with oxygen, at a controlled substoichiometric rate to produce an exothermic reaction with the fixed carbon remaining on said pyrolyzed waste.

* * * * *